Figure 1:
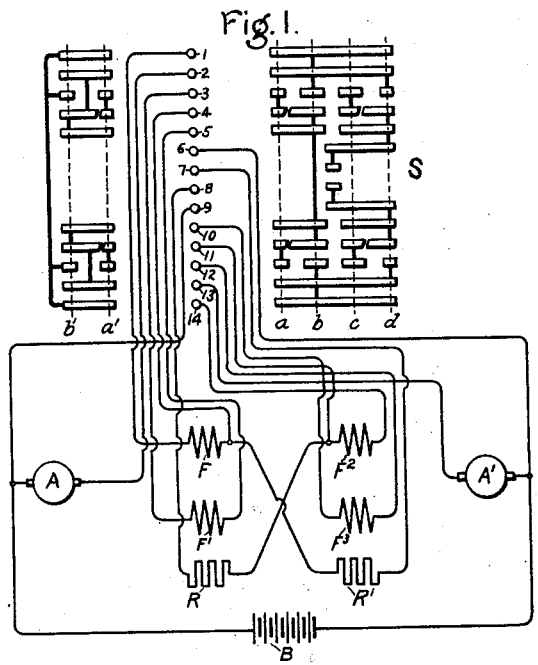

No. 863,188. PATENTED AUG. 13, 1907.
C. B. LARZELERE.
MOTOR CONTROL.
APPLICATION FILED JAN. 16, 1907.

3 SHEETS—SHEET 1.

Witnesses:
Irving E. Steers
J. Ellis Glen

Inventor
Charles B. Larzelere,
by Albert G. Davis
Att'y.

No. 863,188. PATENTED AUG. 13, 1907.
C. B. LARZELERE.
MOTOR CONTROL.
APPLICATION FILED JAN. 16, 1907.

3 SHEETS—SHEET 2.

Witnesses:
Irving E. Steers.
J. Ellis Glen

Inventor,
Charles B. Larzelere.
by Albert G. Davis
Att'y.

No. 863,188. PATENTED AUG. 13, 1907.
C. B. LARZELERE.
MOTOR CONTROL.
APPLICATION FILED JAN. 16, 1907.
3 SHEETS—SHEET 3.
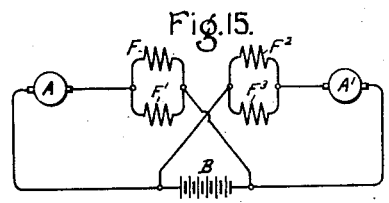
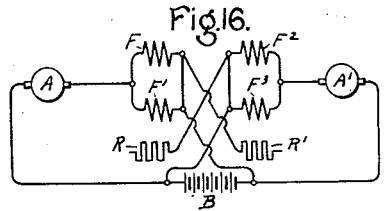
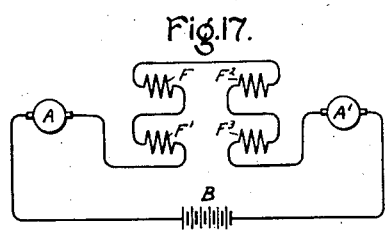
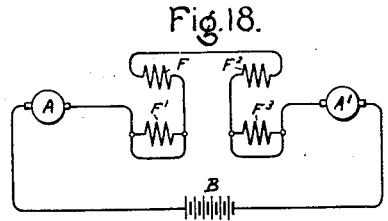
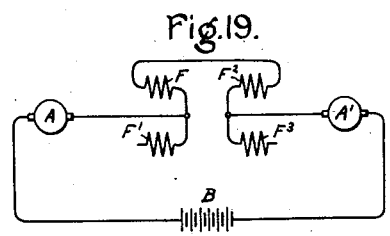
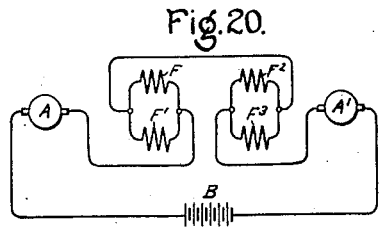
Witnesses:
Irving E. Steers.
J. Ellis Glen
Inventor
Charles B. Larzelere,
by
Att'y.

UNITED STATES PATENT OFFICE.

CHARLES B. LARZELERE, OF SCHENECTADY, NEW YORK, ASSIGNOR TO GENERAL ELECTRIC COMPANY, A CORPORATION OF NEW YORK.

MOTOR CONTROL.

No. 863,188.

Specification of Letters Patent.

Patented Aug. 13, 1907.

Application filed January 16, 1907. Serial No. 352,535.

*To all whom it may concern:*

Be it known that I, CHARLES B. LARZELERE, a citizen of the United States, residing at Schenectady, county of Schenectady, State of New York, have invented certain new and useful Improvements in Motor Control, of which the following is a specification.

My invention relates to the control of series-wound electric motors, and its object is to provide a novel method of shifting the connections of the motors from series to parallel without opening the motor circuit, and without unbalancing the load on the two motors. My invention is thus particularly adapted to the control of electric automobiles, since in such machines it is desirable that the torque should be maintained during speed changes and should remain equal on both driving motors, so as to prevent skidding.

In passing from series to parallel position in accordance with my invention, I provide the motors with divided field windings and first connect the halves of each motor field in parallel with each other. This connection has been employed heretofore for the purpose of securing an intermediate speed without the use of resistances.

My invention consists in the method of shifting the motors from this series connection, with half-fields in parallel, to parallel connection of the motors with half-fields in series. I accomplish this by disconnecting a half-field of each motor, and utilizing it to establish parallel connection without interrupting the motor circuit. More specifically stated, I first shunt each motor by a resistance, then disconnect a half-field of each motor, and break the series connection between the motors; leaving each motor connected to the source in series with resistance. Then I connect the disconnected half-fields in parallel with the resistances, and then break the circuits of the resistances. The motors are thus left connected in parallel with each other to the source of voltage, with no resistance in circuit and with the half-fields of each motor in series. The transition is made without opening the motor circuit and without unbalancing the torques of the motors.

My invention will best be understood by reference to the accompanying drawings, in which Figure 1 shows diagrammatically a pair of motors provided with the controlling switch arranged to control the motors in accordance with my invention; and Figs. 2 to 20, inclusive, show the connections established by the controlling switch of Fig. 1 in its different positions.

In the drawings A and $A^1$ represent the armatures of two series-wound motors, each of which has its field divided in half. The half-fields of motor A are indicated by F and $F^1$, and the half-fields of motor $A^1$ by $F^2$ and $F^3$.

B represents the source of current for the motors, which I have shown as a battery. R and $R^1$ represent resistances.

S is a controlling switch having contact-fingers 1 to 14, four forward running positions indicated by the dotted lines $a$, $b$, $c$ and $d$, and two reverse positions indicated by the dotted lines $a^1$ and $b^1$.

Figure 2:
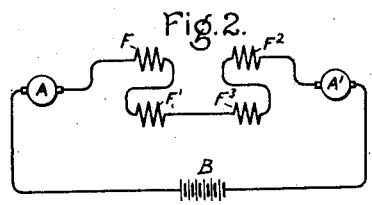
Figure 3:
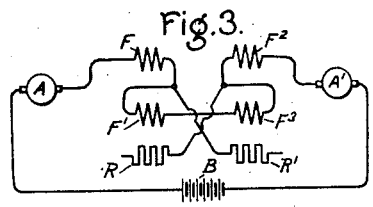
Figure 4:
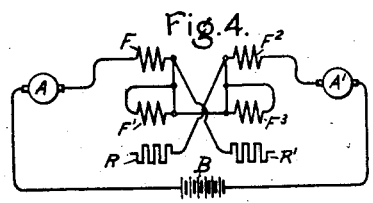
Figure 5:
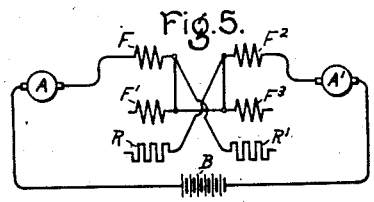
Figure 6:
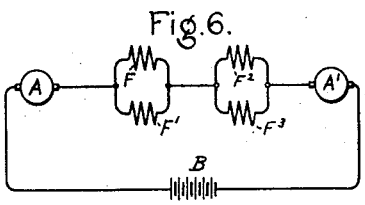
Figure 7:
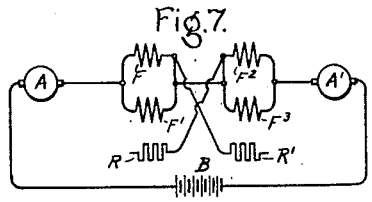

When controlling switch S is moved into its first forward running position, indicated by the dotted line $a$, armature A is connected to one terminal of field F through fingers 1 and 2; field F is connected to field $F^1$ through fingers 4 and 3; field $F^1$ is connected to field $F^3$ through fingers 5 and 10; field $F^3$ is connected to field $F^2$ through fingers 12 and 11; and field $F^2$ is connected through armature $A^1$ through fingers 13 and 14. These connections are shown in Fig. 2. In this position of the switch the motors are connected in series with each other, and the half-fields of each motor are in series. In Fig. 2, the resistances R and $R^1$ are omitted in order to simplify the diagram. These resistances are open-circuited in the first position of the switch; their connections being as shown in Fig. 3. When switch S is moved from position $a$ toward position $b$, the first change that occurs is the short-circuiting of field $F^1$ through fingers 4 and 5, and the short-circuiting of field $F^3$ through fingers 10 and 11. This connection is shown in Fig. 4. The circuits of fields $F^1$ and $F^3$ are then opened at contact-fingers 3 and 12, as shown in Fig. 5. These half-fields are then connected in parallel with the half-fields F and $F^2$, respectively, as shown in Fig. 6. This figure represents the connections established in position $b$ of switch S. In this position the motors are in series with the half-fields of each motor in parallel. Fig. 7 is the same as Fig. 6, with the resistance R and $R^1$ added.

Figure 8:
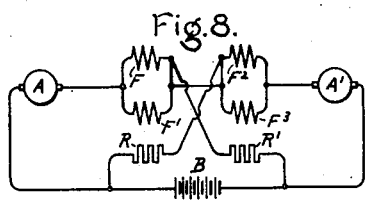
Figure 9:
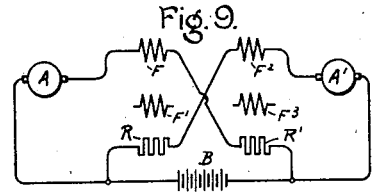
Figure 10:
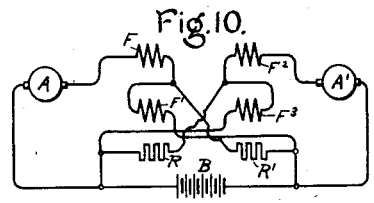

When the switch is moved from position $b$, the left-hand terminal of resistance R is connected to the left-hand terminal of battery B through fingers 8 and 9, and the right-hand terminal of resistance $R^1$ is connected to the right-hand terminal of battery B through fingers 6 and 7. The connections shown in Fig. 8 are thereby established, and it will be seen that a resistance is connected in parallel with each motor. As the movement of the switch continues, the circuit of half-field $F^1$ is broken at both finger 3 and finger 5, and the circuit of half-field $F^3$ is broken at fingers 12 and 10. This is shown in Fig. 9. A further movement of the switch S connects each half-field in parallel to a resistance, as shown in Fig. 10. The half-field $F^1$ is connected in parallel to the resistance $R^1$, and the half-field $F^3$ in parallel to the resistance R. A further movement of the switch breaks the circuits of the two resistances at fingers 7 and 8, leaving the connections shown in Fig. 11 corresponding to position $c$ of switch.

S. In this figure, the two motors are connected in parallel, with the half-fields of each motor in series. It will be noted that the transition from Fig. 6 to Fig. 11, has been made without breaking the motor circuit, and without unbalancing the load on the two motors.

Figure 11:
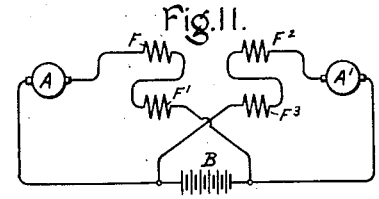
Figure 12:
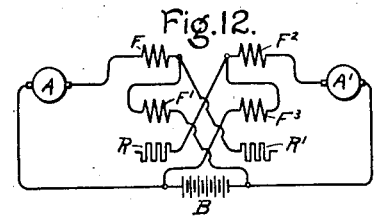
Figure 13:
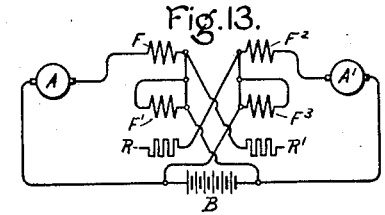
Figure 14:
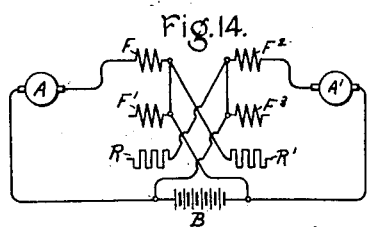

Fig. 12 is the same as Fig. 11, with the resistances added. In Fig. 13, however, fields $F^1$ and $F^3$ are again short-circuited, then open-circuited, as shown in Fig. 14, and then connected in parallel with the half-fields $F$ and $F^2$, as shown in Fig. 15. The connections shown in this figure are those established in position $d$ of switch S. The motors are now in parallel, with the half-fields of each motor in parallel. Fig. 16 is the same as Fig. 15, with the resistances added. Figs. 17 to 20 show the connections established in the reverse-positions of the switch S. These figures correspond to Figs. 2, 4, 5 and 6, except that the field connections are reversed to reverse the direction of rotation of the motors. Fig. 17 shows the connections in position $a^1$ of the switch, and Fig. 20, the connections in position $b^1$.

What I claim as new and desire to secure by Letters Patent of the United States, is,—

1. The method of shifting a pair of series motors with divided field windings from series to parallel connection, which consists in first connecting the halves of each field in parallel to each other, then disconnecting a half-field of each motor and employing these half-fields to connect each motor directly to the source without opening the motor circuit.

2. The method of shifting a pair of series motors with divided field windings from series connection of the motors with half-fields of each motor in parallel to parallel connection of the motors with half-fields in series, which consists in shunting each motor by a resistance, then shunting each resistance by a half-field, and then breaking the circuits of the resistances.

3. The method of shifting a pair of series motors with divided field windings from series connection of the motors with half-fields of each motor in parallel to parallel connection with half-fields in series, which consists in shunting each motor by a resistance, breaking the series connection between the motors and the circuit of one half-field of each motor, connecting said half-fields in parallel with the resistances, and breaking the circuits of said resistances.

4. In combination, a pair of series motors each having its field divided in half and provided with terminal leads for each half-field, and a controlling switch connected to said leads and arranged in one position to connect the motors in series with the half-fields of each motor in parallel and by its movement to another position to disconnect a half-field of each motor and connect the motors in parallel, with the half-fields of each motor in series, without breaking the motor circuit.

5. In combination, a pair of motors each having its field divided in half and provided with terminal leads for each half-field, and a controlling switch connected to said leads and arranged in one position to connect the motors in series, with the half-fields of each motor in parallel, and by its movement to another position to shunt each motor by a resistance, then to break the series connection of the motors and to disconnect a half-field of each motor and connect it in shunt to one of the resistances, and then to open the circuits of the resistances.

In witness whereof, I have hereunto set my hand this 15th day of January, 1907.

CHARLES B. LARZELERE.

Witnesses:
BENJAMIN B. HULL,
HELEN ORFORD.